United States Patent [19]

Dubé et al.

[11] Patent Number: 5,405,428
[45] Date of Patent: Apr. 11, 1995

[54] DECONTAMINATION AND/OR SURFACE TREATMENT OF METALS

[75] Inventors: Ghyslain Dubé, Chicoutimi; François Tremblay, St-Fulgence, both of Canada

[73] Assignee: Alcan International Limited, Montreal, Canada

[21] Appl. No.: 960,376
[22] PCT Filed: Jul. 18, 1991
[86] PCT No.: PCT/CA91/00252
§ 371 Date: Jan. 4, 1993
§ 102(e) Date: Jan. 4, 1993
[87] PCT Pub. No.: WO92/01825
PCT Pub. Date: Feb. 6, 1992

[30] Foreign Application Priority Data
Jul. 20, 1990 [CA] Canada .................. 2021638

[51] Int. Cl.⁶ .................. C23C 22/34
[52] U.S. Cl. .................. 75/403; 75/715; 75/754; 148/710
[58] Field of Search .................. 75/401, 402, 403, 715, 75/754; 148/700, 702, 703, 710

[56] References Cited

U.S. PATENT DOCUMENTS

| | | | |
|---|---|---|---|
| 3,250,521 | 5/1966 | Sergent | 219/430 |
| 3,250,643 | 5/1966 | Sergent | 134/2 |
| 4,508,564 | 4/1985 | Kennedy | 75/403 |
| 4,654,088 | 3/1987 | Fitzpatrick et al. | 75/403 |
| 4,929,283 | 5/1990 | King et al. | 148/700 |

FOREIGN PATENT DOCUMENTS

| | | |
|---|---|---|
| 1174946 | 9/1984 | Canada . |
| 2372660 | 6/1978 | France . |
| 2372905 | 6/1978 | France . |
| 91-5696 | 5/1992 | South Africa . |
| 732101 | 6/1955 | United Kingdom . |
| 2046888 | 11/1980 | United Kingdom . |
| 1084334 | 4/1984 | U.S.S.R. .................. 148/703 |

Primary Examiner—George Wyszomierski
Attorney, Agent, or Firm—Cooper & Dunham

[57] ABSTRACT

The invention relates to a process of decontaminating metal (especially aluminum or aluminum alloy) scrap contaminated with organic material. The problem with such methods is that undue oxidation of the metal may take place as the decontamination proceeds, leading to reduced recovery rates. The process involves heating the scrap in a fluidized bed of solid particles fluidized by a fluidizing gas to a decontaminating temperature high enough to consume the organic material but below the melting point of the metal. The heating step is carried out in the presence of a protective material which protects the aluminum or aluminum alloy against substantial oxidation while the scrap is held in the bed at the decontaminating temperature. Preferred protective materials include organic and inorganic fluorine-containing compounds, particularly $AlF_3$. The process is particularly effective for the treatment of aluminum alloys containing magnesium, which are especially susceptible to oxidation. Scrap decontaminated in this way can be subjected to conventional metal recovery processes, e.g. metal melting, and provide high recovery rates of the metal. The process of the invention can also be used for protecting metal (particularly aluminum and alloys thereof) against excessive oxidation during heat treatments other than decontamination. The invention also relates to the treatment of briquettes of compacted scrap without the need for protection from oxidation and without the need for prior shredding or grinding.

14 Claims, 3 Drawing Sheets

DECONTAMINATION AND/OR SURFACE TREATMENT OF METALS

TECHNICAL FIELD

This invention relates to the decoating of contaminated scrap metals, particularly aluminum scrap, and/or to the surface treatment of metals, particularly aluminum and alloys thereof, in order to reduce the susceptibility of such metals to oxidation during heat treatments.

BACKGROUND ART

The recycling of contaminated metal scrap material, particularly aluminum scrap, is a large and important industry nowadays but it depends to a very large extent for its commercial viability on the percentage of metal that can be successfully recovered from the scrap. Metal scrap material may be of a variety of types, such as turnings from machining operations, used food and beverage containers, large castings, and the like, but in virtually all cases the major contaminants are organic materials such as oil, paints, adhesives and paper. In order to maximize the recovery and minimize the emission of pollutants, it is necessary to remove such organic contaminants from the scrap material before subjecting the scrap to remelting for metal recovery. By removing or substantially reducing organic contaminants, it is possible to increase the percentage of recovered metal by as much as 10–15% by weight, or sometimes more.

One of the best known and most used processes for the decontamination of scrap utilizes the pyrolysis of the organic contaminants in a hot air current, e.g. as carried out in a rotary kiln or packed bed conveyor decoater. This involves contacting the scrap with a moving current of air at a temperature of 400°–600° C. in order to bring about heating of the scrap and combustion of the contaminants. Because of a limited rate of heat transfer when large pieces of scrap are processed, the scrap must first be shredded or ground to increase the surface to volume ratio, which requires a troublesome and costly additional step. Even when shredding is carried out, however, it is difficult to control the temperature of the scrap during the decontamination process and it is found that the temperature can vary considerably according to the position of the scrap in the load, i.e. due to channelling of the heated air, some of the scrap may be overheated and other parts may remain unsuitably cool. Temperature variation of this type results in some of the scrap being unduly oxidized while other parts of the scrap may be only partially decoated. Aluminum alloys having high magnesium contents (e.g. 4–5% by weight) are especially susceptible to oxidation or even melting when overheated and metal recovery can be considerably reduced when such metals are subjected to the conventional decoating process.

The conventional hot air process encounters further difficulties when attempts are made to decoat thin gauge aluminum scrap (e.g. up to 100 microns, and usually 6–7 microns, in thickness) containing from 15 to 70% by weight of aluminum and a high proportion of flammable material, such as paper, e.g. as is the case for thin laminated materials used for the manufacture of hermetically sealed food and beverage containers, and the like. Processing of such material in a stream of hot air is generally not possible because the rapid combustion of the flammable material causes overheating and oxidation of the thin aluminum and may result in partial fusion. Given the thinness of the sheets, the least amount of surface oxidation dramatically decreases the metal recovery and complete oxidation or melting of the metal may result.

Alternative apparatus for decoating metal scrap has been suggested, but not put into practice on a wide scale. For example, British patent publication no. 2,046,888 B of Nov. 19, 1980 in the name of Tolltreck Ltd. discloses the use of a heated fluidized bed for the decoating of contaminated scrap. Similar procedures are also mentioned in U.S. Pat. No. 4,508,564 issued on Apr. 2, 1985 to Kennedy and in U.S. Pat. No. 3,250,643 issued on May 10, 1966 to Sergent. However, while the use of a fluidized bed improves the heat distribution throughout the charge of scrap undergoing the decoating treatment, it is found that the degree of oxidation of the metal remains high and thus there is no great advantage. Furthermore, the fluidized bed process has still required the prior shredding or grinding of compacted or large size scrap.

DISCLOSURE OF INVENTION

It is therefore an object of the present invention, at least in its preferred forms, to provide a process for the decoating of aluminum scrap that can be operated without undue loss of metal.

Another object of the invention, at least in a preferred forms, is to provide a process for the protection of the surface of aluminum and alloys thereof against oxidation.

The present invention is based, at least in part, on the finding that certain solid or gaseous materials can be introduced into a fluidized bed used for the decoating or surface treatment of contaminated metal scrap to prevent undue oxidation of the scrap. Moreover, it has also been unexpectedly found that bundles of compacted scrap can be treated in a fluidized bed without the need for prior shredding or grinding.

Thus, according to one aspect of the present invention, there is provided a process of decontaminating metal scrap containing metal, having a melting point, contaminated with organic material, which process comprises heating the scrap in a fluidized bed of solid particles fluidized by a fluidizing gas to a decontaminating temperature high enough to consume said organic material but below the melting point of said metal, wherein said heating step is carried out in the presence of a protective material which protects the metal against oxidation while said scrap is held in said bed at said decontaminating temperature.

According to another aspect of the invention, there is provided a process of heat treating an oxidisable metal to modify properties of said metal, which process comprises heating the oxidisable metal in a fluidized bed of solid particles fluidized by a fluidizing gas to an elevated treatment temperature below the melting point of said metal, wherein said heating step is carried out in the presence of a material which protects the metal against substantial oxidation during said heating step.

According to another aspect of the invention, there is provided a process of recovering aluminum-containing metal from scrap containing said metal contaminated with organic material, which comprises decontaminating said scrap by heating the scrap in a fluidized bed of solid particles fluidized by a fluidizing gas to a decontaminating temperature high enough to consume said organic material but below the melting point of said metal, wherein said bed of solid particles includes particles of a solid protective material which protects the metal against oxidation while said scrap is held in said bed at said decontaminating temperature, removing said decontaminated scrap from said bed without removing all adhering solid particles of said bed from said scrap, melting said decontaminated scrap in the absence of added salt flux to produce molten metal and residual contaminants, and separating said molten metal from said residual contaminants.

A particular advantage of the present invention is that the fluidizing gas may be an oxygen-containing gas, such as air or a mixture of air and other gases, so that the process can be operated economically. A further advantage of the present invention is that it is unnecessary to carry out a preliminary shredding or grinding operation on bundled scrap, so that scrap in virtually any form, even compacted scrap received from recycling stations, can be used directly. Briquettes or bundles of scrap having densities in the range of 150–800 Kg/m$^3$, generally 250–800 Kg/m$^3$ and most preferably at least 500 Kg/m$^3$, can be treated in this way. The elimination of the preliminary shredding or grinding step provides a considerable economic advantage.

The surprising ability to treat compacted bundles in a fluidized bed contrary to previous assumptions applies to the treatment of compacted material whether or not a protective material is present in the fluidized bed or fluidizing gas. As a result, it is believed that this aspect of the invention is independent of the requirement for a protective material and applies to otherwise known fluidized bed treatments, all of which previously were directed to the treatment of small individual pieces rather than to compacted bundles of individual pieces.

Thus, according to yet another aspect of the invention, there is provided a process of decontaminating bundles of compacted scrap metal contaminated with organic material, which process comprises heating the bundles of scrap in a fluidized bed of solid particles fluidized by a fluidizing gas to a decontaminating temperature high enough to consume said organic material but below a melting point of said metal.

All aspects of the present invention are applicable to the treatment of virtually all common metals, e.g. ferrous metals, copper, etc., but the process is especially effective for the treatment of aluminum and aluminum alloys because these metals are particularly susceptible to oxidation and have low melting points so that careful temperature control is required. The aspects of the present invention utilizing the protective material are especially useful when applied to the decontamination of aluminum scrap containing a high content of magnesium or thin gauge aluminum scrap of the type mentioned above since scrap materials of this type are particularly vulnerable to excess Oxidation during fluidized bed techniques.

BRIEF DESCRIPTION OF THE DRAWINGS

The present invention is discussed in more detail below with reference to the accompanying drawings, in which.

BEST MODES FOR CARRYING OUT THE INVENTION

Figure 1:
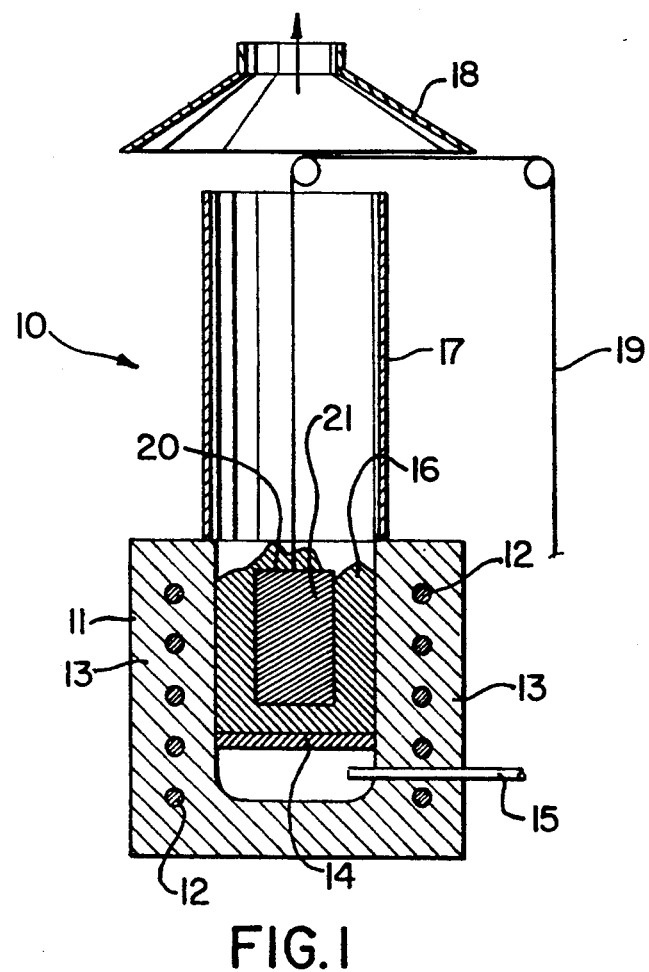
FIG. 1 is a cross section of an apparatus suitable for carrying out the process of the present invention.

A main aspect of the present invention requires the use of a protective material during a fluidized bed heat treatment of contaminated scrap metal. The protective materials which may be employed in the present invention are generally solid, volatile liquid or gaseous fluorine-containing materials, e.g simple and complex inorganic or organic fluorides. The material may be any fluoride compound that will react with the metal to inhibit surface oxidation. Examples of suitable solids include $AlF_3$, $Na_2AlF_6$ (sodium cryolite), $K_2AlF_6$ (potassium cryolite), $NH_4BF_4$, etc. Examples of suitable gases include $SF_6$, $HF$, $SiF_4$, $BF_3$, etc. When the material is $HF$ it may be generated in situ from more stable compounds such as $NaF$ and $KF$, etc., by reaction with water vapour present in the products of combustion of organic materials in the scrap. When the metal to be treated is a magnesium-containing aluminum alloy, it is especially advantageous to use a fluorine-containing material, such as $AlF_3$, capable of reacting under the process conditions with the magnesium present at the metal surface to form $MgF_2$ which appears to form a tight barrier against oxidation.

When the protective material used in the present invention is a solid, it is preferably used as a constituent of the fluidized bed, and may if desired form the entire solid used to form the bed (although this is usually not required). Alternatively, the solid may be entrained in the fluidizing gas used to activate the bed.

When the protective material is a gas, it is preferably introduced into the bed as a component of the fluidizing gas or as a separate gas stream. The protective gaseous material cannot in general be used alone as the fluidizing medium when the invention is used to decontaminate metal because oxygen must usually be present to oxidize the organic contaminants, but it could be used alone when the invention is applied to the surface treatment of uncontaminated metal.

A particularly surprising feature of the present invention is that the amount of the protective material usually required to prevent substantial oxidation is relatively small. For example, when the protective material is a solid, such as $AlF_3$, it may generally be used in an amount of about 5–10 wt. % of the fluidized bed. When the protective material is a gas, it may be used in an amount of a few volume percent of the fluidizing gas, preferably 0.1–1.0% by volume. This makes the present invention particularly economical, especially when expensive protective materials are employed.

The solid particles used to form the fluidized bed usually have diameters in the range of 20 microns to 2 mm, and preferably in the range of 50–500 microns in order to maximize the rate of heat transfer. This rate is linked to the surface to volume ratio of the particles, which should be as high as possible, and to the efficiency of the fluidization. Particles with diameters greater than about 500 microns have a small surface to volume ratio, whereas particles having diameters smaller than 50 microns are difficult to fluidize adequately (they tend to produce "plug flow").

The particles forming the bed, except for the particles of protective material if the material is provided in solid form, are generally made of an inert material such as sand, salts (e.g. NaCl), alumina and mixtures thereof. Alumina is preferred because of its commercial availability in the desired diameter range (e.g. smelter grade alumina having a diameter range of 100–150 microns) and because its particles tend to be more spherical than many other materials, such as sand, so that it is easier to fluidize. If the bed is to consist entirely of the protective material, the use of aluminum fluoride is preferred because it is also readily available in a smelter grade having a diameter of 100–150 microns.

The particle bed is usually maintained at a temperature of 400°–650° C. depending on the nature of the contaminants to be volatilized, oxidized or pyrolysed, but the bed temperature should not exceed the melting temperature of the metal in the scrap to be treated. For example, an alloy of aluminum containing 4–5% by weight of magnesium has a melting point between 580 and 600° C. so temperatures between about 400°–550° C. are preferred in this case. Either electric heating or gas heating of the fluidizing gas on the particle bed can be employed.

Once the particles of the bed have been fluidized, the aluminum scrap can be easily submerged for treatment. A metal wire basket can be used to hold shredded, ground or uncompacted scrap, i.e. to submerge the scrap and to retrieve it from the bed after treatment. Compacted scrap, such as briquettes and bundles, can be handled as it is without resort to the use of a basket.

When a briquette or bundle is immersed in the fluidized bed it is unexpectedly observed that the particles in close proximity to the briquette, i.e. within 2 to 5 cm, slow their movement and gas channelling within the porous solid occurs. This channelling within the compacted solid ensures complete combustion of the organic materials contained within the scrap or complete treatment of the surface of the metal in those cases where metal treatment rather than decontamination is the objective.

The treatment time required for contaminated scrap depends on the nature and quantity of the contaminant to be removed, as well as the nature of the scrap, i.e. whether it is compacted, shredded or ground. For non-compacted scrap, the residence time in the fluidized bed is usually from 30 seconds to 3 minutes. For compacted bales or briquettes, the residence time is usually from 5 to 20 minutes.

The decoating aspect of the present invention produces an additional unexpected advantage. When decontaminated aluminum scrap undergoes remelting for recovery of the metal, it is usual to add about 2% by weight (based on the scrap weight) of a fluxing salt so that the metal separates cleanly from any oxide present in the scrap or produced during the remelting operation. When aluminum scrap is decoated by the process of the invention in the presence of a solid protective material, such as $AlF_3$, in the fluidized bed, it is found that no fluxing salt need be added during the remelting step. This is because some of the particles from the bed remain adhered to the decoated scrap, even if the scrap undergoes a vibrating treatment to remove excess particles. The small amount of residual protective material therefore acts as a fluxing agent for the remelting operation. When the bed contains 10% by weight of solid protection material, e.g. $AlF_3$, and the residual amount of solid particles in the decoated scrap is 1% by weight, only 0.1% by weight of the protective material is present in the scrap during remelting. It is surprising that such a small amount of the material is effective as a fluxing agent, but this is found to be the case.

Consequently, the invention includes the remelting of scrap decontaminated by the process of the invention in the presence of a protective material capable of acting as a fluxing salt, in the absence of any additional fluxing salt-for the remelting step.

The aspect of the invention which relates to the treatment of uncontaminated metal to improve various properties while avoiding surface oxidation can be carried out in essentially the same way as the treatment of contaminated scrap. The quantities of the protective material are essentially the same and the treatment times depend on the heat treatment process involved. This procedure can be used during the heat treatment of any cast or fabricated product to prevent oxidation at elevated temperature. Such heat treatments may be, for example, for the purposes of increasing mechanical properties (e.g. annealing), stress relief, homogenizing, and the like.

The aspect of the invention which relates to the treatment of bundles of compacted scrap in a fluidized bed without the use of a protective material applies generally to aluminum scrap briquettes preferably having a density of 150–800 kg/m$^3$. The conditions of the treatment are essentially the same as those in which a protecting material is used. Less metal is recovered by this technique due to surface oxidation, but the prior art requirement for shredding or grinding of the scrap is avoided.

Apparatus suitable for carrying out all aspects of the present invention is described in the following with reference to the accompanying drawings.

FIG. 1 shows a cross section of a fluidized bed apparatus 10 suitable for use in the present invention. The apparatus consists of a container 11 having heating elements 12 embedded in the sidewalls 13 thereof. A perforated plate 14 extending across the interior of the container 11 close to the bottom thereof acts as a gas distributor. Gas enters the interior of the container below the perforated plate through a pipe 15. The interior of the container above the plate is substantially filled with a bed 16 of solid particles. The gas passes through the distributor 14, fluidizes the bed 16 and then escapes through a chimney 17 to a gas exhaust 18. Optionally, an afterburner (not shown) can be introduced at this point to ensure complete combustion of any unburned volatiles. This may be required when treating metals having a high proportion of organics.

A pulley arrangement 19 is connected to a wire basket 20 capable of holding pieces of scrap material 21. The pulley can therefore be used to raise and lower the basket so that successive charges of scrap material may be submerged in the bed 16 and then withdrawn.

The heating elements 12 and possibly additional elements (not shown) for the gas introduced through the pipe 15 raises the temperature of the bed 16 to the effective range of 400–650 degrees centigrade. As a result, organic contaminants on the scrap material are burned, volatilized or pyrolysed and the resulting gaseous products escape to the exterior through the chimney 17 and gas exhaust 18.

In this type of apparatus, the protective material required to protect the scrap from undue oxidation may be in the form of particles of the bed 16 or may be a gaseous product introduced through the pipe 15 with the fluidizing gas.

Figure 2:
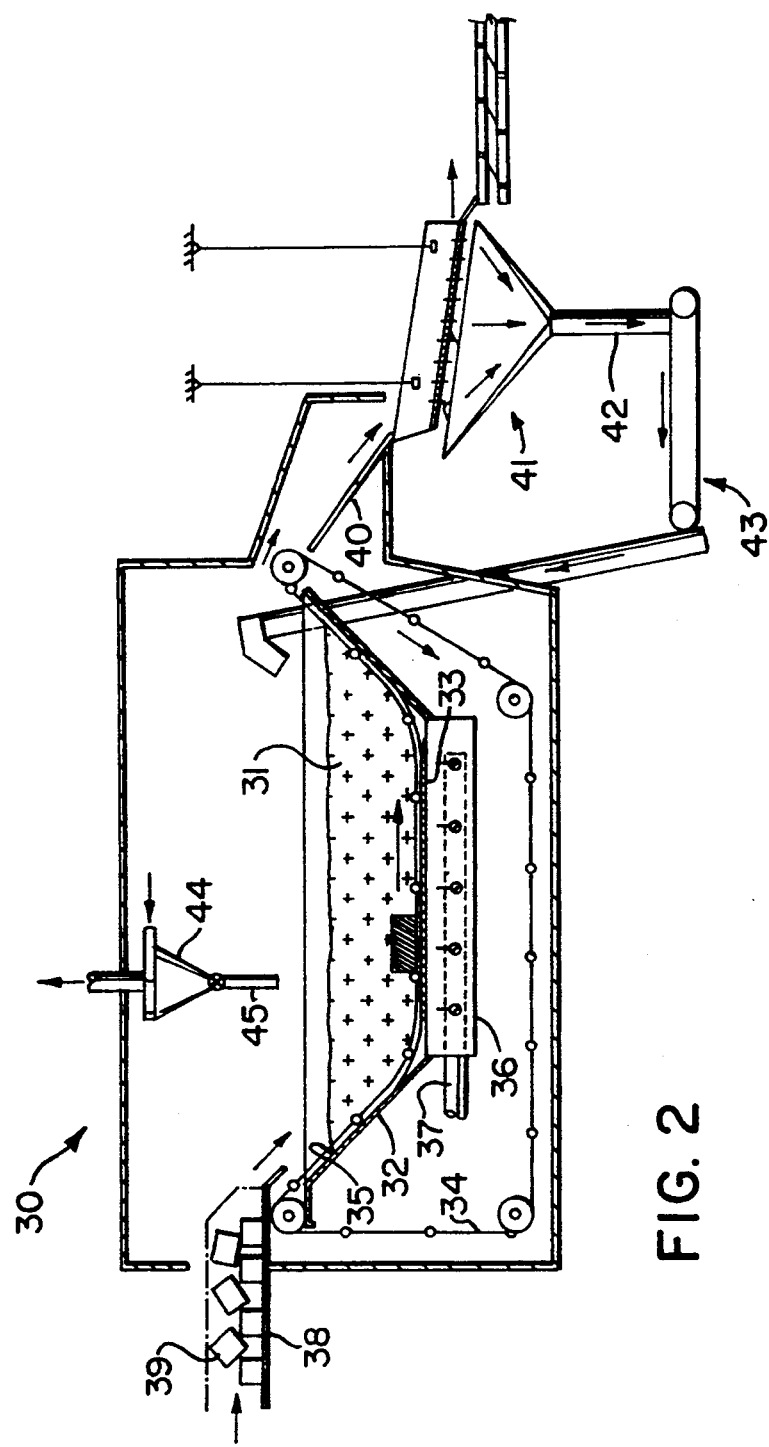
FIG. 2 is a cross section of an alternative apparatus for carrying out the process of the present invention.

FIG. 2 is a cross section of an alternative apparatus 30 suitable for the continuous processing of compacted scrap bundles. In this case, a bed 31 of particles is held within a dish shaped container 32 having a perforated lower wall 33. An endless perforated conveyor belt 34 passes through the container 32 between the bed of particles and the inner surface 35 of the container. A gas plenum 36 is positioned below the container in communication with the perforated lower wall 33 and a fluidizing gas is fed into the plenum through a gas pipe 37. Gas fed through the pipe 37 at a suitable pressure fluidizes the bed of solid particles and the conveyor belt 34 is driven through the container by a motor (not shown).

An additional conveyor belt 38 feeds compacted scrap briquettes 39 into the container 32 whereupon they rapidly become submerged in the bed 31 and are gradually moved through the container by the conveyor 34. The bed 31 is heated by the hot fluidizing gas or by other means (not shown) to the required temperature so that organic contaminants on the scrap are consumed. The conveyor 34 eventually removes the treated briquettes from the container 32 whereupon they enter a chute 40 to a treatment zone 41 where they are shaken in combination with air jet cleaning and vacuum treatment processing to remove particles of solid from the bed. The particles thus freed are collected via collection means 42 and returned to the fluidized bed 31 via conveyors 43.

Combustion products and the like contained in the fluidizing gas as it emerges from the bed exit the apparatus via a cyclone device 44 for removing entrained solids, which solids are returned to the bed via pipe 45. An afterburner (not shown) can again optionally be added.

As in the case of the apparatus shown in FIG. 1, the protective material may be contained as a solid in the bed 31 dr as a gas or vapour in the fluidizing gas introduced through the pipe 37.

Apparatus of the type shown in FIGS. 1 and 2 is effective for the removal of substantially all the organic contaminants from coated scrap with a minimum of metal loss.

As well as being used for the decoating of contaminated aluminum scrap, the process of the present invention may be used for the thermal treatment of pieces of aluminum to protect the surfaces of the pieces from oxidation during subsequent processing.

The invention is illustrated further by the following Examples.

EXAMPLE 1

Conventional metal recovery operations were carried out on several batches of Class 1 contaminated aluminum scrap material (oily process scrap from can body manufacture comprising mainly aluminum alloy AA3004) which had been decoated by various procedures leaving various residual amounts of machining oils.

Figure 3:
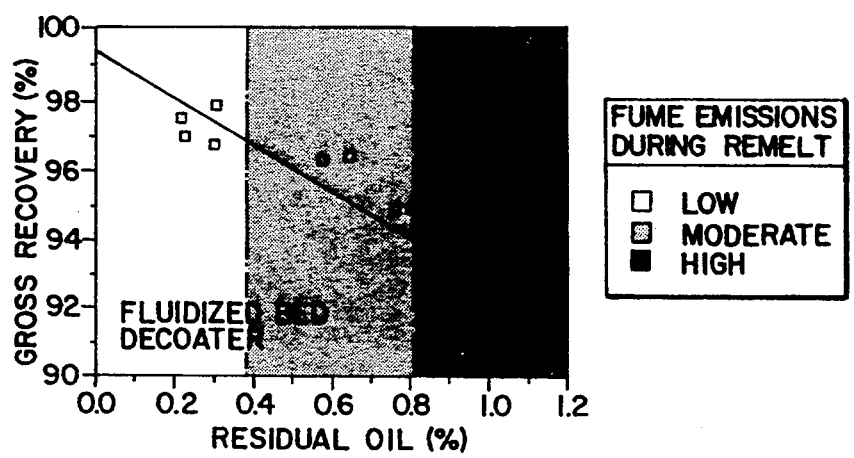
FIG. 3 is a graph showing metal recovery versus content of residual oil in aluminum scrap material.

FIG. 3 of the accompanying drawings illustrates the metal recoveries obtained from these materials compared with the amounts of residual oil. As the amount of residual oil decreased, the percentage metal recovery improved considerably. For metal having 0.0–0.4% by weight of residual oil resulting from a decoating process according to the present invention, metal recovery above 96% was achieved.

It will be seen that the removal of a few percent of contaminating oil resulted in an improvement of metal recovery of about 8%, which would substantially improve the economic performance of the recycling process. In addition, the emission of polluting fumes during the remelting operation was considerably reduced when scrap containing less residual oil was treated.

EXAMPLE 2

Two batches of beverage can scrap (UBC, alloys AA3004 and AA5182) were decoated, one by a conventional hot air process (Alcan Decoater) and the other using apparatus of the type shown in FIG. 1, employing AlF$_3$ as the protective material added to the fluidized solid (alumina) in an amount of 10% by weight. The decoated metal was then subjected to remelting and the metal was recovered.

Table i below shows the percentages of metal recovered from the two procedures.

TABLE 1

| Gross Metal Recovery From UBC Scrap Based on Metal Available | | |
|---|---|---|
| DECOATING SYSTEM | CONVENTIONAL HOT AIR | FLUIDIZED BED |
| GROSS RECOVERY (%) | 93 | 95.5 |

As can be seen from the Table, the recovery of metal obtained by using the present invention is much higher than that obtained from the conventional procedure.

EXAMPLE 3

Two batches of compacted scrap bundles were subjected to metal recovery. The first underwent a decoating procedure according to the present invention, and the second was not decoated at all.

The results are shown in Table 2 below.

TABLE 2

| Net Recovery Based on Metal Available (assuming 90% metal recovery in dross) | | |
|---|---|---|
| | RECOVERY (WT %) | |
| SCRAP TYPE | UNDECOATED | DECOATED WITH FLUIDIZED BED |
| Baled Class 1 | 96.5 | 98.9 |
| Baled Class 2 | 93.1 | 97.5 |

From this Table it can be seen that for "class one" scrap 3004 alloy (1% by weight of Mg) contaminated with oil, the gross metal recovery increased from 96.5% by weight to 98.9% by weight when previously decontaminated using the process of the present invention. For "class two" type scrap (coated process scrap from can lid manufacture) consisting mainly of AA5182 aluminum alloy (containing 4.5% by weight Mg) coated with a layer of epoxy-based varnish, the gross recovery increased from 93.1% by weight to 97.5% by weight. These are substantial increases.

EXAMPLE 4

Figure 4:
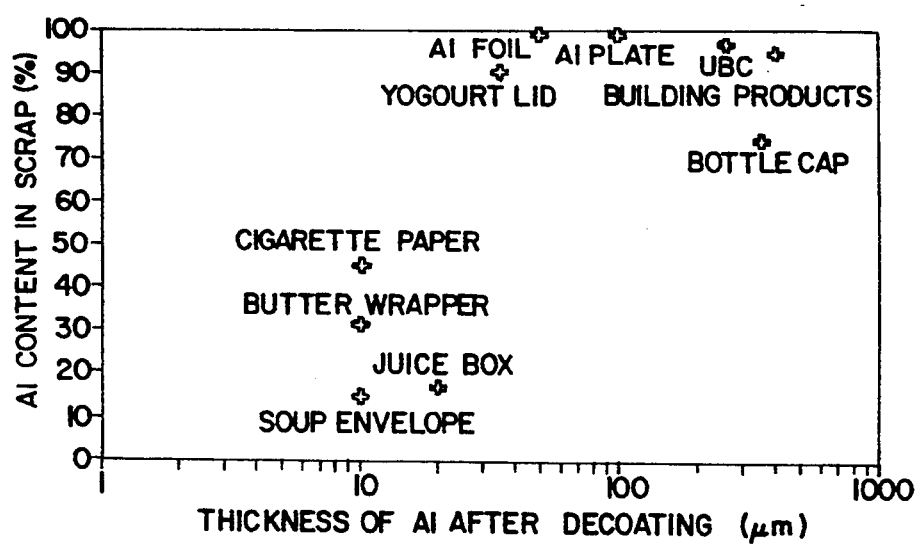
FIG. 4 is a graph showing the types of scrap materials that have been successfully treated by the process of the present invention.

FIG. 4 of the accompanying drawings shows various types of scrap material which were subjected to decontamination according to the fluidized bed process of the present invention using solid AlF$_3$ as a component of the fluidized bed. The fact that many of these scrap materials can be subjected to decoating at all shows the effectiveness of the present invention.

EXAMPLE 5

Used beverage can scrap was subjected to fluidized bed decoating in a bed containing particles of alumina and 10 wt % of aluminum trifluoride at a temperature of 550° C. for a period of 2 minutes. The aluminum in the scrap contained 1.8% by weight of magnesium and the scrap as a whole contained 2.5% by weight of organic contaminants. The decoated scrap was then subjected to metal recovery. The metal recovery rate was 99.1% by weight based on the available metal.

The procedure was repeated using a bed containing only alumina. The metal recovery rate was 96.8% by weight, i.e. much inferior to that of the process of the present invention.

EXAMPLE 6

A fluidized bed of the type shown in FIG. 1 was operated and the rate of heat transfer to scrap added to the bed was measured.

A conventional air decoater was also operated and the rate of heat transfer was also measured.

Figure 5:
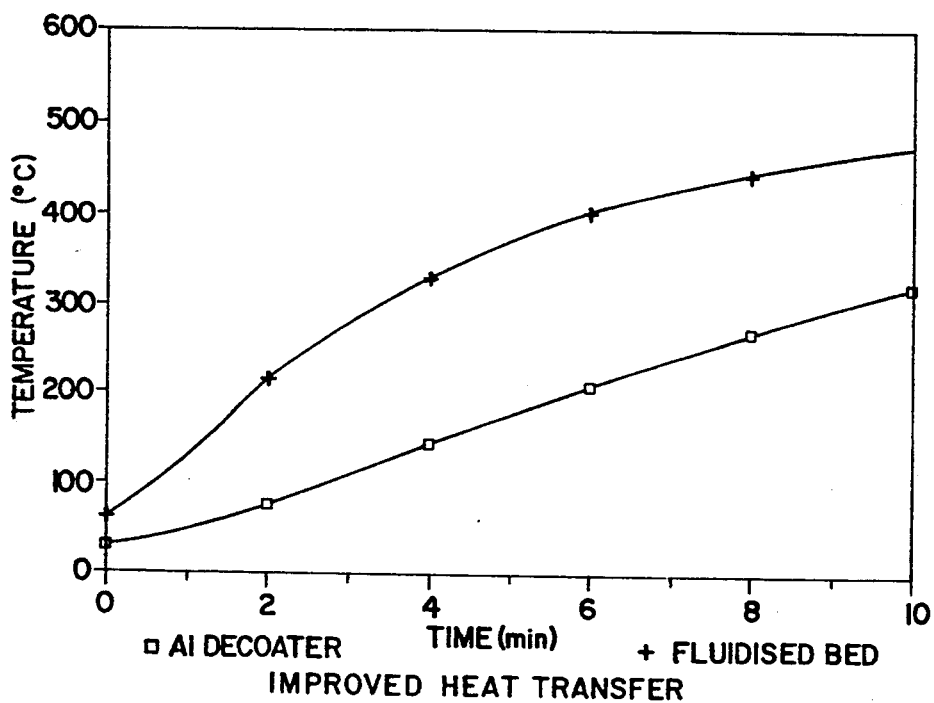
FIG. 5 is a graph comparing heat transfer rates for decoating procedures carried out in air and in a fluidized bed.

The results are shown in FIG. 5, from which it can be seen that the fluidized bed decoater is much more efficient than the conventional air decoater.

INDUSTRIAL APPLICABILITY

The invention can be used in the scrap metal recovery industry, or other industries requiring the heat treatment of metals susceptible to oxidation, in order to achieve greater ease of handling and improved economics.

It is claimed:

1. A process of decontaminating magnesium-containing aluminum scrap contaminated with organic material, comprising heating the scrap, which has a melting point, in a fluidized bed of solid particles fluidized by a fluidizing gas to a decontaminating temperature high enough to consume said organic material but below the melting point of said metal, wherein said heating step is carried out in the presence of a fluoride compound as a protective material which protects the metal against oxidation while said scrap is held in said bed at said decontaminating temperature, said fluoride compound of reacting with said magnesium at a surface of said scrap to form sufficient $MgF_2$ to act as a barrier against oxidation under the conditions prevailing during said heating step.

2. A process according to claim 1 wherein said protective material is a solid in the form of particles present in said bed.

3. A process according to claim 2 wherein said bed comprises said particles of said protective material and particles of substantially inert material.

4. A process according to claim 1 wherein said protective material is a gas introduced into said bed as a constituent of said fluidizing gas.

5. A process according to claim 1 wherein said protective material is a gas introduced into said bed separately from said fluidizing gas.

6. A process according to claim 1 wherein said protective material is a compound selected from the group consisting of $AlF_3$, $Na_2AlF_6$, $K_2AlF_6$, $NH_4BF_4$, $SF_6$, HF, $SiF_4$ and $BF_3$.

7. A process according to claim 1 wherein said protective material is aluminum trifluoride.

8. A process according to claim 1 wherein said scrap is in the form of substantially separate pieces.

9. A process according to claim 1 wherein said scrap is in the form of compacted bundles.

10. A process according to claim 9, wherein said scrap is in the form of compacted bundles having a density of 150–800 Kg/m$^3$.

11. A process according to claim 1 wherein said decontaminating temperature is in the range of 400°–650° C.

12. A process according to claim 1 wherein said fluidizing gas comprises air.

13. A process for decontaminating magnesium-containing aluminum scrap contaminated with organic material, comprising heating the scrap, which has a melting point, in a fluidized bed of solid particles fluidized by a fluidizing gas to a decontaminating temperature high enough to consume said organic material but below the melting point of the metal, wherein said heating step is carried out in a fluidized bed consisting of particles of a fluoride compound as a protective material which protects the metal against oxidation while said scrap is held in said bed at said decontaminating temperature, said fluoride compound being capable of reacting with said magnesium at a surface of said scrap to form $MgF_2$ under the conditions prevailing during said heating step.

14. A process of recovering magnesium-containing aluminum alloy from scrap containing said alloy contaminated with organic material, comprising decontaminating said scrap by heating the scrap in a fluidized bed of solid particles fluidized by a fluidizing gas to a decontaminating temperature high enough to consume said organic material but below the melting point of said alloy, removing said decontaminated scrap from said bed without removing all adhering solid particles of said bed from said scrap, melting said decontaminated scrap in the presence of a salt flux to produce molten alloy and residual contaminants, and separating said molten alloy from said residual contaminants; wherein said bed of solid particles includes particles of a fluoride compound as a solid protective material which protects the alloy against oxidation while said scrap is held in said bed at said decontaminating temperature and which is capable of acting as a salt flux for the alloy, said fluoride compound reacting with said magnesium at a surface of said alloy to form sufficient $MgF_2$ to act as a barrier against oxidation under the conditions prevailing during said heating step; and wherein no salt flux is added to said alloy prior to said melting step.

* * * * *

UNITED STATES PATENT AND TRADEMARK OFFICE
CERTIFICATE OF CORRECTION

PATENT NO. : 5,405,428
DATED      : April 11, 1995
INVENTOR(S) : Ghyslain Dube and Francois Tremblay It is certified that error appears in the above-indentified patent and that said Letters Patent is hereby corrected as shown below:

In column 7, line 39, delete "dr" and insert —or—.

In column 8, line 18, delete "i" and insert —1—.

In column 9, line 47, delete "of". (1st Occurr.)

Signed and Sealed this

Thirtieth Day of April, 1996

Attest:

BRUCE LEHMAN

*Attesting Officer*      *Commissioner of Patents and Trademarks*